United States Patent
Habila et al.

(10) Patent No.: US 12,311,337 B1
(45) Date of Patent: May 27, 2025

(54) FUNCTIONALIZED SILICA NANOPARTICLES FOR LEAD ADSORPTION

(71) Applicant: KING SAUD UNIVERSITY, Riyadh (SA)

(72) Inventors: Mohamed Abdelaty Habila, Riyadh (SA); Ahmad Saud Abdullah Alobaysi, Riyadh (SA); Ibrahim Aljammaz, Riyadh (SA); Zeid Abdullah Alothman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/670,093

(22) Filed: May 21, 2024

(51) Int. Cl.
| | | |
|---|---|---|
| *B01J 20/10* | (2006.01) | |
| *B01J 20/28* | (2006.01) | |
| *B01J 20/30* | (2006.01) | |
| *B01J 20/32* | (2006.01) | |
| *C22B 3/00* | (2006.01) | |
| *C22B 3/24* | (2006.01) | |

(52) U.S. Cl.
CPC ....... *B01J 20/103* (2013.01); *B01J 20/28004* (2013.01); *B01J 20/28019* (2013.01); *B01J 20/3071* (2013.01); *B01J 20/3078* (2013.01); *B01J 20/3085* (2013.01); *B01J 20/3204* (2013.01); *B01J 20/3217* (2013.01); *B01J 20/3251* (2013.01); *C22B 3/24* (2013.01); *C22B 13/04* (2013.01)

(58) Field of Classification Search
None
See application file for complete search history.

(56) References Cited

U.S. PATENT DOCUMENTS

| | | |
|---|---|---|
| 7,578,935 B2 | 8/2009 | Lin et al. |
| 2007/0098607 A1 | 5/2007 | Tang et al. |
| 2008/0233509 A1 * | 9/2008 | Keoshkerian ...... G03G 9/09725 430/111.1 |
| 2010/0224568 A1 * | 9/2010 | Selcuk ...................... C07F 7/20 210/732 |

FOREIGN PATENT DOCUMENTS

| | | | |
|---|---|---|---|
| CN | 103193245 A * | 7/2013 | ............. C01B 39/00 |
| EP | 1777712 A1 | 4/2007 | |
| FR | 2790974 A1 | 9/2000 | |
| JP | 2007146229 A | 6/2007 | |

OTHER PUBLICATIONS

Machine Translation for CN-103193245-A (Year: 2013).*

* cited by examiner

*Primary Examiner* — Michael Forrest
(74) *Attorney, Agent, or Firm* — Nath, Goldberg & Meyer; Joshua B. Goldberg (57) ABSTRACT

A method for preparing silica nanoparticles, the method comprising: adding centrimonium bromide (CTAB) to a water and ethanol to create a first reaction mixture; adding NH4OH to the reaction mixture to create a second reaction mixture; adding a first amount of tetraethyl orthosilicate (TEOS) to the second reaction mixture to create a third reaction mixture; adding ethylenediaminetetraacetic acid (EDTA) to the third reaction mixture then adding a second amount of TEOS to create a fourth reaction mixture; obtaining formed silica spheres; separating the formed silica spheres; washing the formed silica spheres with water and ethanol; and drying the formed silica spheres in an oven for at least about 8 hours to obtain silica nanoparticles.

8 Claims, 8 Drawing Sheets

FUNCTIONALIZED SILICA NANOPARTICLES FOR LEAD ADSORPTION

BACKGROUND

1. Field

The present disclosure provides a method for lead adsorption, and particularly, separation of lead from thallium.

2. Description of the Related Art

Environmental cleanup, including the removal of lead and thallium isotope pollution, has become an essential research topic at levels of local and international interest. Many techniques have been used for this purpose such as chemical precipitation, electro-flotation, ion exchange, reverse osmosis, and adsorption. Adsorption is considered an effective purification and separation technique for pollution control and removal. The most effective adsorbents currently are nanomaterial-based adsorbents which have been applied to wastewater purification. Nanostructure adsorbents have exhibited much higher efficiency and faster adsorption rates in water treatment when compared to traditional adsorbents.

Excessive concentrations of heavy metals are produced annually and discharged to the environment worldwide. The radioactive species are the most dangerous including Pb(II) and Tl. The discharge of such polluted water without proper treatment leads to serious biohazards and threatens the health of human beings. Thallium (Tl) is a toxic metal which can be consumed in drinking water as well as in food chains. This presents a huge danger to the health of humans. Thallium-bearing mineral resources are in large quantities in China and have been thoroughly exploited and used leading to a massive quantity of thallium being released into the environment. Thallium has many applications, including in the fields of pharmaceutical, chemical, aerospace, electronics, and optical industries. But Thallium is extremely toxic, far exceeding the toxicity levels of Hg and As. Thallium has a poisonous dosage of about 8-10 mg/kg in adult humans. Thallium acute toxicity to humans can be distinguished by diarrhea, temporary hair loss, vomiting, and chronic impacts on the vital nervous systems such as the lungs, heart, liver, kidneys and even death. Epidemiological data shows during pregnancies, exposure to Tl may have a grave effect on birth outcomes, such as fetal death, congenital malformations, or reduced birth weight.

Chronic exposure to Tl can be experienced at concentration levels between the ranges of 0.1 and 100 µg/L. The World Health Organization designates thallium and its compounds as hazardous wastes of major concern. The European COST Action TD1407 has listed Tl to be among technology-critical elements, with the capability of negative environmental risks and capable threats to the health of humans. In order to minimize the health risks arising from Tl, the United States Environmental Protection Agency (US EPA) recommends a maximum permissible level of 2 µg/L Tl for drinking water, with the aim of reducing it to 0.5 µg/L. In 1992, the US Environmental Protection Agency (US EPA) fixed the maximum contaminant level (MCL) of thallium in drinking water at 2 µg/L.

Another common toxic heavy metal that can pose grave public health danger even at extremely lower levels for younger children particularly is lead. Degrading heavy metals in the environment is difficult, as their pollution constitutes a very grave danger to the environment. For example, $Pb_{2+}$ on human health, has acute and chronic toxic effects which can lead to anemia, headaches, and diarrhea, and inhibition of heme production. Lead exposure can also destroy the kidney, nervous systems, reproductive systems, liver and brain.

The isolation of thallium-201 from lead-201 is a prerequisite for isolation of thallium 201 from radioactive thalium-203. Thallium-201 through electron capture, decays by a 73 hour half-life, emitting K-x-rays of 68-83 keV of mercury in 98% abundance, with gamma-rays of 135 as well as 167 keV in 10% total abundance. Due to its efficient shelf-life, mode of decay, and photon energies, $^{201}$Tl was Thallium's radioisotope and selected for development purposes. Thallium-201 is identified to be a potentially useful radioisotope for use in various medical applications, such as myocardial visualizations and physiological assessments, renal medullary imaging, and tumor detection. Kawana was the first scientist to suggest the use of radio-Thallium in nuclear medicine. Specifically in neurophysiologic functions and organ distribution, thallium showed some similarities with potassium in terms of its biological characteristics. $Tl^+$ and $K^+$ have biological similarities that can best be described through the physico-chemical interactions between the hydrated ionic radius of $Tl^+$ which is around the size of Rubidium and a potassium ion. Reports of this radius have shown that when it is passed through a membrane the mechanism of passive penetration is used. Therefore, radio-thallium may be a promising potassium analog and may have capabilities for myocardial visualization and early detection of areas of diminishing areas of perfusion early detection, and radio-nuclide uptake as "cold spots" (reduced activity regions). The method that is most preferable is that of the latter due to its permission of a practically mono-isotopic $^{201}$Tl preparation. In recent times, the production of $^{201}$Tl has been mostly based on highly enriched thallium-203 and accelerated protons nuclear reaction:

$$^{203}Tl(p,3n)^{201}pb \rightarrow ^{201}Tl$$

Other sources for the production of $^{201}$Tl from $^{201}$Pb exist. They are bismuth and lead. Consequently, the production method of Tl from targets determines the procedure for radiochemical separation. A two-stage $^{201}$Tl production procedure is required if thallium is applied as a target. The first stage is the separation of $^{201}$Pb and thorough purification of thallium impurities. Next, is the 30-35 hours in which it is necessary for $^{201}$Tl accumulation from $^{201}$Pb radioactive-thallium to occur, then $^{201}$Tl is separated from radioactive-lead, and then purification of the impurities. Different combinations of extraction methods such as co-precipitation, and ion-exchange chromatography may be used. Considerable losses of $^{201}$Pb may be generated from the production method of $^{201}$Tl from Tl target (and, consequently, $^{201}$T1) owing to radioactive decay undergone both during the first stage of radiochemical processing of the irradiated, as well as the irradiation of the thallium target.

Thus, an efficient method of separating and removing thallium and lead from the environment is needed.

SUMMARY

The present subject matter relates to silica nanoparticles modified with amino groups, herein, "functionalized silica nanoparticles," In an embodiment, the functionalized silica nanoparticles can be used for adsorbing lead from a sample, for example, for separating lead-201 from thallium-201 in a sample, to achieve isolation of thallium-201 from radioactive thalium-203. In an embodiment, the functionalized silica nanoparticles comprise about 53% to about 54% carbon, about 3% to about 4% nitrogen, about 33% to about 34% oxygen, and about 9% to about 10% sulfur. In an embodiment, the present subject matter provides a method for tuning silica structures to improve separation of lead and thallium isotopes.

In one embodiment, the present subject matter relates to a method for preparing silica nanoparticles, the method comprising combining centrimonium bromide (CTAB) with water and ethanol to create a first reaction mixture; stirring the first reaction mixture; adding $NH_4OH$ to the reaction mixture to create a second reaction mixture; stirring the second reaction mixture; adding a first amount of tetraethyl orthosilicate (TEOS) to the second reaction mixture to create a third reaction mixture; stirring the third reaction mixture; adding ethylenediaminetetraacetic acid (EDTA) and a second amount of TEOS to the third reaction mixture to create a fourth reaction mixture; stirring the fourth reaction mixture to obtain formed silica spheres; separating the formed silica spheres; washing the formed silica spheres with water and ethanol; and drying the formed silica spheres in an oven for at least about 8 hours to to provide the functionalized silica nanoparticles.

In one embodiment, the present subject matter relates to silica nanoparticles prepared according to the method described above.

In one embodiment, the present subject matter relates to a method for separating lead and thallium, the method comprising: contacting a sample containing lead with the silica nanoparticles prepared according to the method described above.

These and other features of the present subject matter will become readily apparent upon further review of the following specification.

BRIEF DESCRIPTION OF DRAWINGS

FIGS. 1A, 1B, and 1C illustrates morphology of implementations of silica nanoparticle/EDTA-S as described herein.

FIGS. 2A, 2B, and 2C illustrates the morphology of implementations of the silica nanoparticle-2 as described herein.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a" "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to functionalized silica nanoparticles for lead adsorption, e.g., lead-201 adsorption. In an embodiment, the functionalized silica nanoparticles are prepared by modifying silica particles with amino groups. In an embodiment, the functionalized silica nanoparticles comprise about 53% to about 54% carbon, about 3% to about 4% nitrogen, about 33% to about 34% oxygen, and about 9% to about 10% sulfur. In an embodiment, the functionalized silica nanoparticles can be used for separation of lead and thallium, such as lead and thallium isotopes In an embodiment, the functionalized silica nanoparticles can separate lead-201 from thallium-201.

In an embodiment, the functionalized silica nanoparticles can separate thallium-201 from lead-201 by adsorbing lead-201. Thallium-201 is a radioactive isotope used in medical imaging to diagnose coronary artery disease, parathyroid hyperactivity, heart attacks, and tumors. Lead-201 is a nuclear reaction product.

Adsorption is considered an effective purification and separation technique for pollution control and removal of lead and thallium isotopes from the environment The isolation of thallium-201 from lead-201 is a prerequisite for isolation of thallium 201 from radioactive thalium-203.

Functionalization of silica-based nanoparticles with amino groups achieves improved separation affinity towards isotopes of lead-201. Ethylenediaminetetraacetic acid (EDTA) is incorporated within the structure of the silica nanoparticles resulting in improved separation of thallium-201 from lead-201.

SEM and TEM images of the silica-EDTA particles or functionalized silica nanoparticles show a uniform sample shape, with porosity. The FTIR analysis confirms the presence of nitrogen containing compounds and hydroxyl groups on the surface of the prepared silica particles.

According to an embodiment, the functionalized silica nanoparticles can adsorb lead from a sample at a pH ranging from about pH 2 to about pH 7. In an embodiment, the pH can be about pH 3. As described herein, the effect of pH on the separation of lead and thallium was investigated in a pH range of about pH 2 to pH 7. The results revealed that pH 3 was the most suitable for adsorption and efficient separation. In an embodiment, the lead is lead-201.

In an embodiment, a method for adsorbing lead from a sample can include contacting the functionalized silica nanoparticles with a sample for a period of time. In an embodiment, the lead is lead-201. In an embodiment, the method comprises separating lead-201 from thallium-201.

As described herein, a method for separation of thallium-201 from lead-201 can include using functionalized silica nanoparticles to achieve isolation of thallium-201 from radioactive thalium-203, which is useful for nuclear medicine and for diagnosis of heart disease.

The present subject matter can provide a method for tuning silica structures to improve isotopes separation, such as separation of lead-201 from thallium-201.

In one embodiment, the present subject matter relates to a method for preparing functionalized silica nanoparticles, the method comprising: adding centrimonium bromide (CTAB) to water and ethanol to create a first reaction mixture; stirring the first reaction mixture for at least about 30 minutes; adding $NH_4OH$ to the first reaction mixture to create a second reaction mixture; stirring the second reaction mixture for at least about 10 minutes; adding a first amount of tetraethyl orthosilicate (TEOS) to the second reaction mixture to create a third reaction mixture; stirring the third reaction action mixture for at least about 10 minutes; adding ethylenediaminetetraacetic acid (EDTA) and a second amount of TEOS to the third reaction mixture to create a fourth reaction mixture; stirring the fourth reaction mixture to obtain silica spheres, wherein stirring lasts for at least about 30 minutes; separating the fsilica spheres from the fourth reaction mixture; washing the formed silica spheres with water and ethanol; and drying the formed silica spheres in an oven for at least about 8 hours to obtain silica nanoparticles.

In an embodiment of the present method, about 1 g of CTAB may be added to 200 mL water and 100 mL ethanol.

In another embodiment of the present method, about 20 mL of $NH_4OH$ may be added to the first reaction mixture.

In a further embodiment, the first amount of TEOS may include 1000 µL. The TEOS may be added in about five— 200 µL increments and each of the five increments may be added at least about every 10 minutes.

In an embodiment of the present method, about 50 mL of EDTA having a concentration of about 1000 mg/L may be added to the third reaction mixture.

In another embodiment, the second amount of TEOS may be about 1000 µL and may be added in about two 500 µL increments. Each of the about two increments may be added at least about every 30 minutes.

In a further embodiment, the formed silica spheres may be separated by a centrifuge. The formed silica spheres may be dried in an oven for at least about 8 hours.

A method for preparing functionalized silica-nanoparticles in EDTA can include mixing the functionalized silica nanoparticles with about 150 mL of acetonitrile and about 13 mL hydrochloric acid to create a mixture. The mixture may then be set aside for at least about 12 hours, then centrifuged to isolate purified functionalized silica-nanoparticles in EDTA-(NP/EDTA). The silica-NP/EDTA may be washed with water. The silica-NP/EDTA may then be dried at about 60° C.

In one embodiment, the present subject matter relates to functionalized silica nanoparticles prepared according to the method described above. The functionalized silica nanoparticles may have an oval shape. In various embodiments, the functionalized silica nanoparticles may have a size ranging from about 700 nm to about 838 nm. In other embodiments, the functionalized silica nanoparticles may have a size of about 437 nm. In some embodiments, the functionalized silica nanoparticles may have a diameter ranging from about 361 nm to about 580 nm. In other embodiments, the functionalized silica nanoparticles may have a diameter ranging from about 336 to about 371 nm. In still other embodiments, the functionalized silica nanoparticles may have a diameter ranging from about 437 to about 429 nm.

In various embodiments, the functionalized silica nanoparticles may have a composition of about 53% to about 54% carbon, about 3% to about 4% nitrogen, about 33% to about 34% oxygen, and about 9% to about 10% sulfur. In other embodiments, the silica nanoparticles comprise about 53.78% carbon, about 3.44% nitrogen, about 33.54% oxygen, and about 9.24% sulfur. In another embodiment, the functionalized silica nanoparticles may have a composition of about 11% to about 12% carbon, or 11.56% carbon, 56% to 57% oxygen, or 56.12% oxygen, and 32% to 33% silicon, or 32.32% silicon.

The present subject matter relates to a method for separating lead and thallium, the method comprising: contacting a sample including lead with the silica nanoparticles prepared according to the method described above. In an embodiment, the lead is lead-201 and the thallium is thallium-201.

In one embodiment of the method for separating lead and thallium, the silica nanoparticles may be contact with the sample for a period of time ranging from at least about 0.5 min to at least about 180 minutes. In another embodiment of the method for separating lead and thallium, the sample may have a pH of about 3. In some embodiments, the sample may have a pH e ranging from about 2 to about about 7.

The following examples will help to illustrate properties of the functionalized silica nanoparticles as described herein.

Example 1

Method of Preparing Functionalized Silica Nanoparticles

For preparation of silica-NP/EDTA-Surfactant, 1.0 g CTAB was added to a reaction vessel containing 200 mL of water and 100 mL of ethanol. After stirring for 30 minutes, 20 mL of NH4OH was added to the mixed solvents and stirring for 10 minutes. Then, 200 µL of TEOS was added every 10 minutes 5 times to achieve 1000 µl, stirred for 10 minutes, then 50 mL of 1000 mg/L EDTA solution was added. After stirring for 30 min, 500 µl of TEOS was added 2 times every 30 min. Then, the mixture was stirred for 20 hours. Finally, the formed silica spheres were separated by centrifuge, washed with ethanol and water, and dried overnight in the oven. Part of the sample was subjected to surfactant removal by mixing with 150 mL of acetonitrile with 13 mL of (Hydrochloric acid 10.42M). The mixture was kept overnight then centrifuged to isolate the purified silica-NP/EDTA, which was then washed with water ant dried at 60° C. The prepared samples were characterized by SEM, TEM, EDS, XRD, FTIR.

Example 2

Adsorption and Separation Studies of Lead and Thallium

A buffer solution was prepared to assess the adsorption and separation process. Silica-NP/EDTA and silica-NP/EDTA-surfactant was mixed with the desired metal solution including lead and thallium. The contact time between the metal's liquid phase and solid adsorbent surfaces was optimized to maximize the separation capacity. The phases were separated by centrifuge and reduction of the metal's concentration was detected by inductively coupled plasma mass spectrometry (ICP-MS). The conditions for adsorption were optimized to achieve maximum separation between lead and thallium.

Example 3

Adsorption and Separation Studies for Radioactive Pb-201

The standard procedure to produce radioactive Pb-201 from enriched material Tl-203 was plated on the target, then it was put in the cyclotron to irradiate for a period of 7.0 hour by energy 26Mev:

$$^{203}Tl_{(p,3n)^-} \rightarrow ^{201}Pb$$

After that target was achieved, the concentration of radioactive Pb-201 was measured using gamma spectroscopy. The initial concentration was 1167 µCi/mL. Pb-201 was mixed with each kind of silica material. The adsorption medium, containing 1 mL buffer solution, 1 mL of Pb-201, and 0.05 g of silica-NP, was subjected to shaking for 10 min. Then, the phases were separated by disc (millex filter membrane 0.22 µm). The uptake of Pb-201 was detected by gamma spectroscopy.

Example 4

SEM and EDX for Silica-NP/EDTA and Silica-NP/EDTA-Surfactant

Figure 1A:
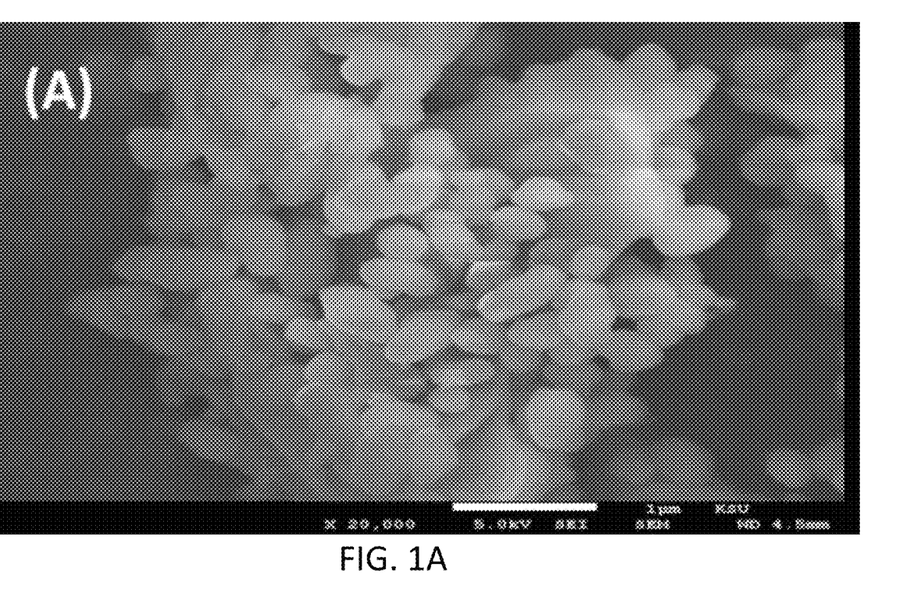
FIG. 1A shows SEM at magnification 20000.
Figure 1B:
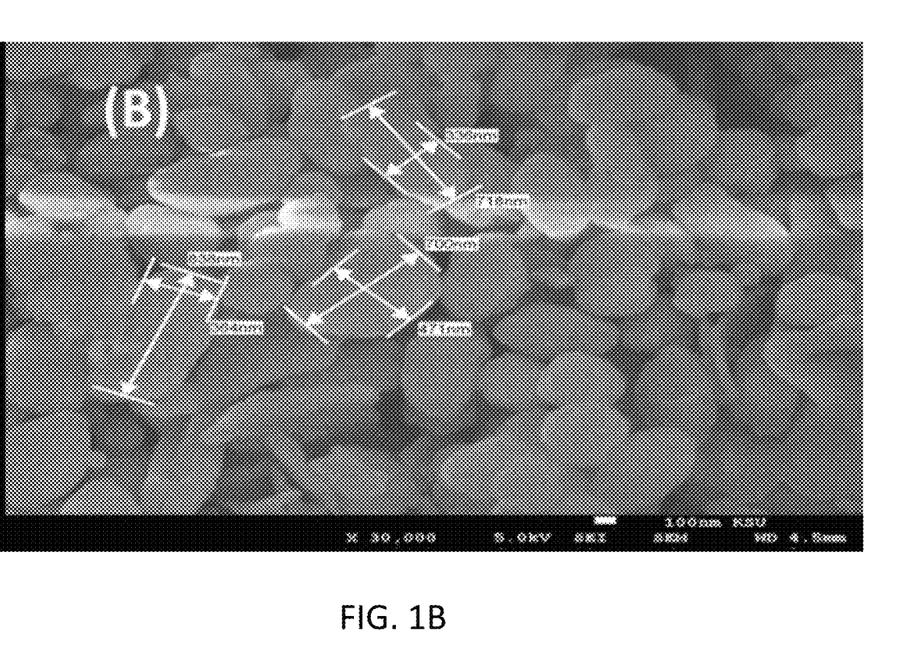
FIG. 1B shows SEM magnification 30000.
Figure 1C:
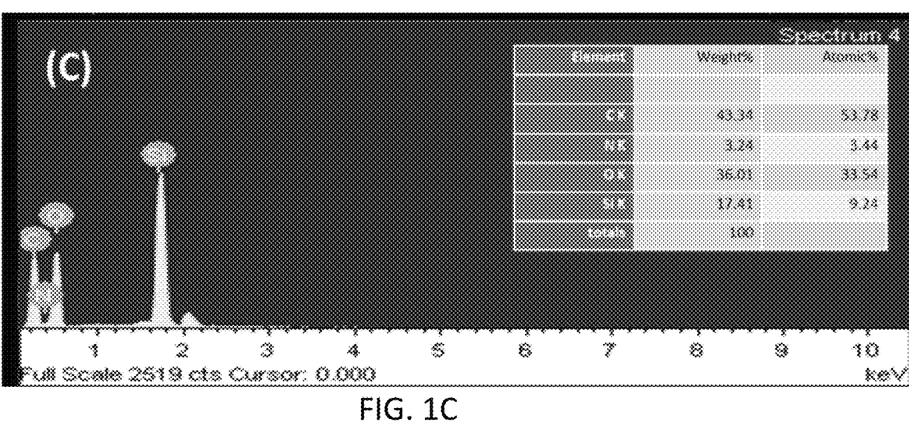
FIG. 1C shows the energy-dispersive X-ray spectroscopy (EDX) results.

The surface morphology and shape of the prepared silica nanoparticles/EDTA-S was examined by scanning electron microscope (FIG. 1 A and FIG. 1B). The silica nanoparticle samples showed an oval shape and the samples were uniform, as presented in FIG. 1A at magnification 20000. The particle size, shown in FIG. 1B ranged from about 700 nm to about 838 nm and the diameter ranged from about 336 nm to about 371 nm. The elemental composition of the prepared samples was analyzed by Energy-dispersive X-ray spectroscopy (EDX), as illustrated in FIG. 1C, which showed the main elements of C is 53.78%, N is 3.44%, O is 33.54% and Si is 9.24%.

Figure 2A:
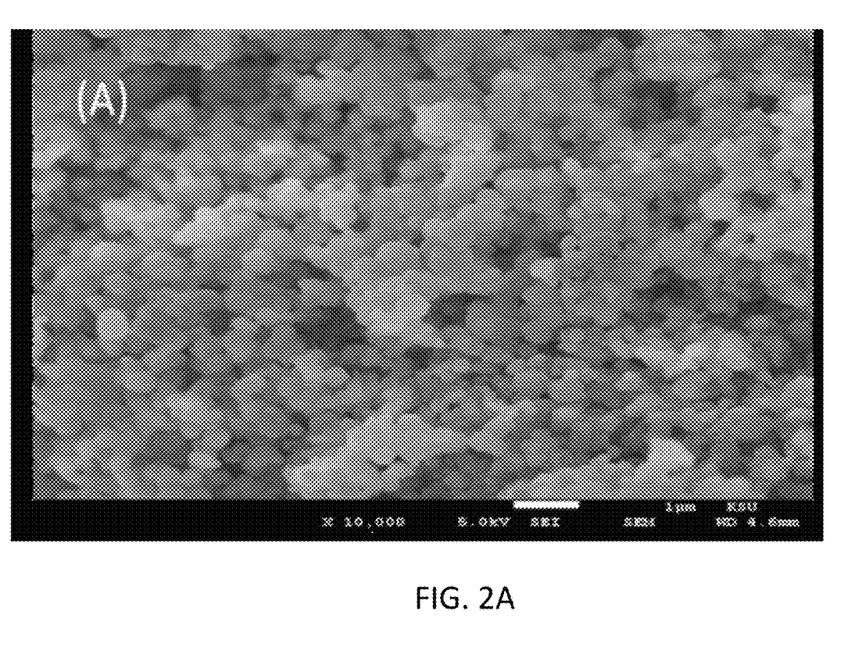
FIG. 2A shows SEM at magnification 10000.
Figure 2B:
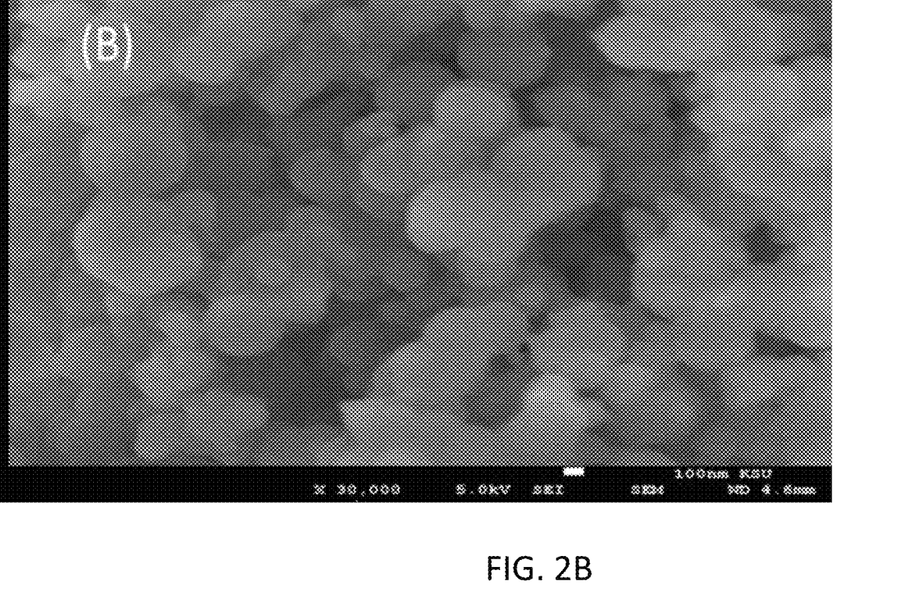
FIG. 2B shows SEM at magnification 3000.
Figure 2C:
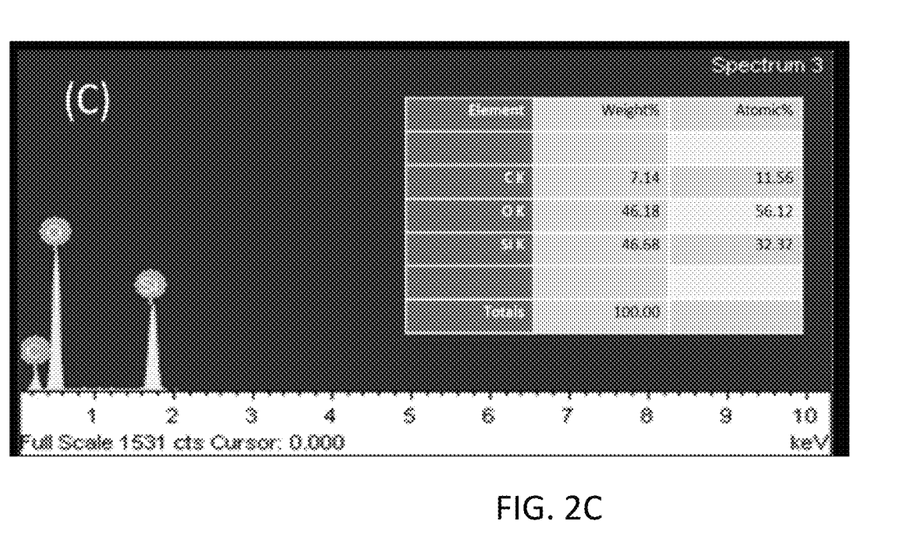
FIG. 2C shows the EDX results.

After cleaning the porous structure of the silica/EDTA material by removing the surfactant, the surface morphology and the shape of the prepared materials were observed using scanning electron microscope (SEM) as illustrated in FIG. 2A and FIG. 2B. The silica/EDTA porous structure samples showed an aspherical shape and the whole samples were uniform as presented in FIG. 1A at magnification 10000 while the particle size, shown in FIG. 2B was 437 nm. The elemental composition of the prepared samples was analyzed by the EDX as shown in FIG. 2C, showing the main elements of C at 11.56%, O at 56.12% and Si at 32.32%.

Example 5

SEM and EDX for Silica-NP/EDTA and Silica-NP/EDTA-Surfactant

Figure 3A:
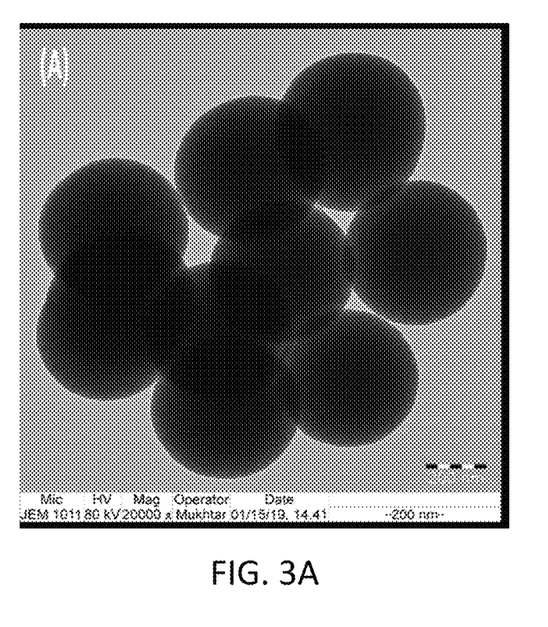
FIGS. 3A, 3B, 3C, and 3D illustrates the TEM of implementations of silica-NP/EDTA-Surfactant at magnification 20000 (FIG. 3A) and at 60000 (FIG. 3B), and implementations of silica-NP/EDTA at magnification 40000 (FIG. 3C) and 100000 (FIG. D).
Figure 3B:
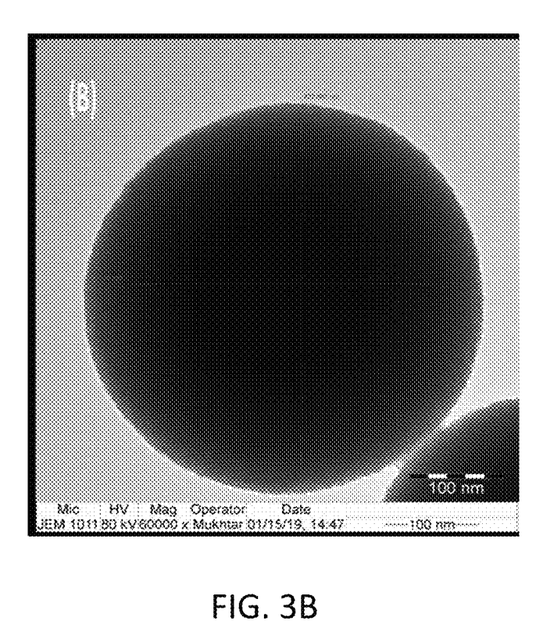
Figure 3C:
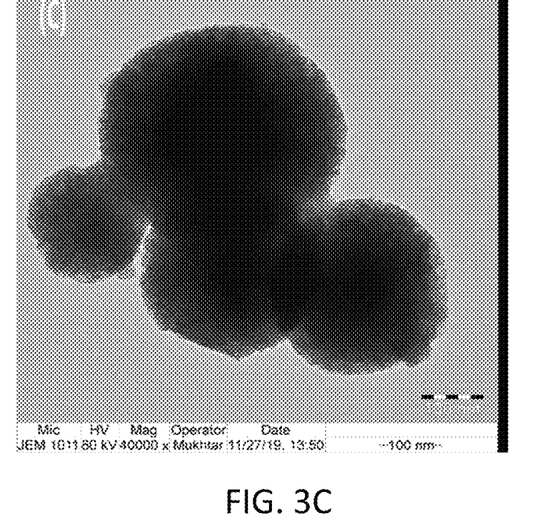
Figure 3D:
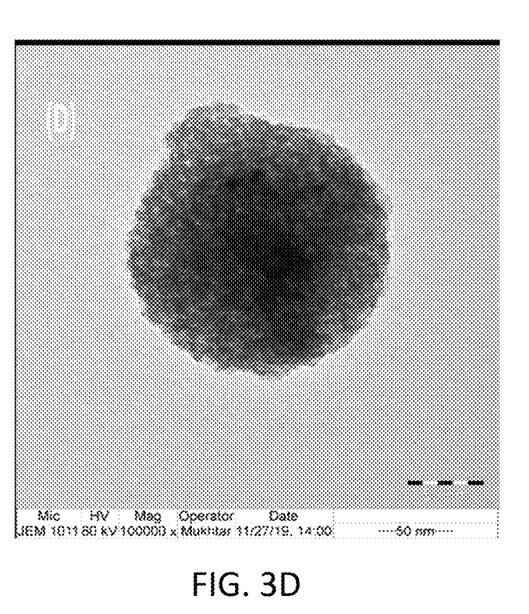

The structure of silica-NP/EDTA and silica-NP/EDTA-surfactant was examined by transmission electron microscopy (TEM), which confirmed the uniform structure with aspherical shape as shown in FIG. 3A and FIG. 3B. The magnification was 20000 for FIG. 3A and 60000 for FIG. 3B and the size of the particles was 437 nm to 429 nm. FIG. 3C and FIG. D showed the structure after removing the surfactant which exhibit porous aspherical shape at magnification 40000 for FIG. 3C and 100000 for FIG. 3D.

Example 6

X-Ray Diffraction (XRD) for Silica-NP/EDTA and Silica-NP/EDTA-Surfactant

Figure 4:
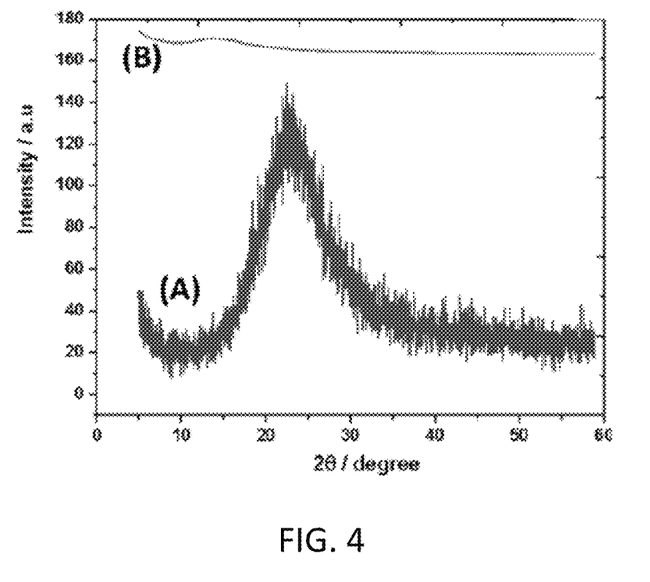
FIG. 4 shows a graph of an XRD of implementations of silica-NP/EDTA (line A) and implementations of silica-NP/EDTA-Surfactant (line B).

The structure of the prepared silica particles was investigated by X-ray diffraction (XRD), as illustrated in FIG. 4. A broad peak was detected which is related to the amorphous structure of the prepared samples. The XRD broad peak in the modified silica particles confirmed the successful formation of the amorphous silica structure under the applied conditions.

Example 7

FTIR Spectra for Silica-NP/EDTA and Silica-NP/EDTA-Surfactant

Figure 5:
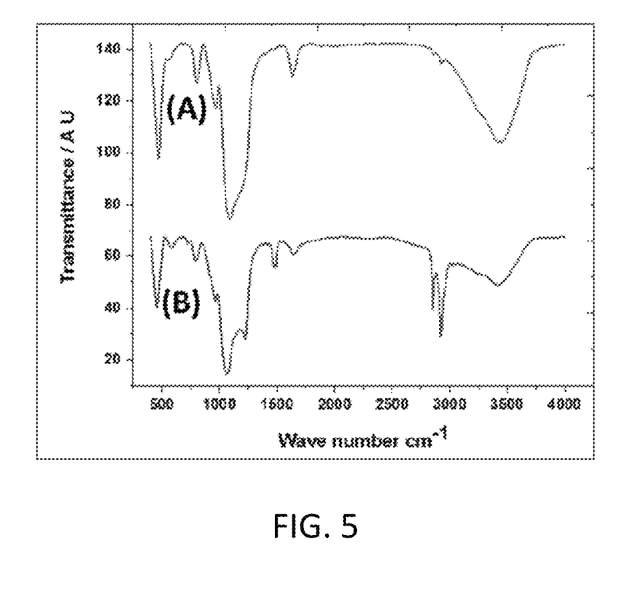
FIG. 5 shows a graph of an XRD of implementations silica-NP/EDTA (line A) and implementations of silica-NP/EDTA-Surfactant (line B).

Surface functional groups of the functionalized silica nanoparticles were studied by FTIR spectra for the prepared silica-NP/EDTA and silica-NP/EDTA-surfactant as illustrated in FIG. 5. A broad band was detected at 1065 cm$^{-1}$ with a shoulder at 1011 cm$^{-1}$, which may be attributed to Si—O—Si vibration. In addition to weak bands 793 and 952 cm$^{-1}$, corresponding to the Si—O—Si groups and Si—OH groups stretching, respectively. Peaks at 1468, 2850 and 2919 cm$^{-1}$ are related to the aliphatic C—H from the surfactant in case of silica-NP/EDTA-Surfactant. The peaks between 1620 to 1662 cm$^{-1}$ can be attributed to the combination of N—H and C=O groups. The peaks at around 3200 to 3500 are detected due to OH groups and/or amino groups.

Example 8

Figure 6:
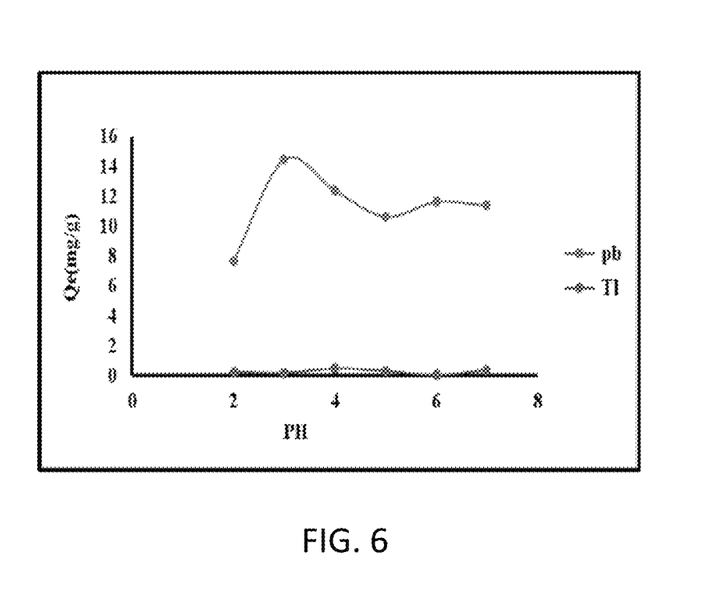
FIG. 6 shows a graph illustrating the effects of pH on the adsorption capacity of Pb and Tl onto implementations of silica-NP/EDTA-Surfactant.

The Effect of pH on the Absorption Capacity of Pb and Tl onto Silica-NP/EDTA-Surfactant The effect of pH on the adsorption capacity of Pb and Tl onto silica-NP/EDTA-Surfactant was examined as illustrated in FIG. 6. It was shown that pH 3 for the adsorption medium exhibited the maximum ability for separation of lead and thallium. The adsorption capacity of thallium is very poor which indicates the ability of the prepared materials to separate lead from thallium by selective adsorption.

Example 9

Figure 7:
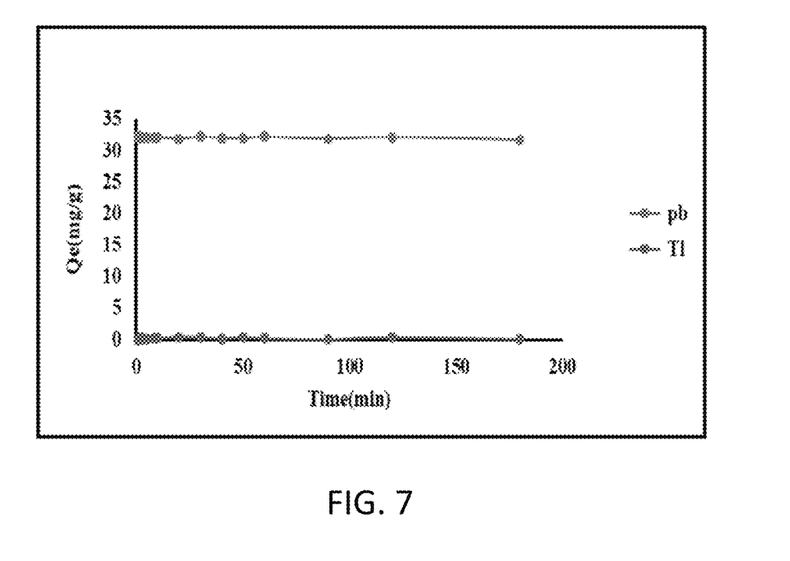
FIG. 7 shows a graph illustrating the effect of time on the adsorption capacity of Pb and Tl onto implementations of silica-NP/EDTA-Surfactant.

The Effect of Time on the Absorption Capacity of Pb and Tl onto Silica-NP/EDTA-Surfactant The contact time is an important factor controlling the adsorption process and the rate of uptake of heavy metals on the adsorbent materials. Therefore, the contact time was investigated in the range between 0.5 min and 180 min as illustrated in FIG. 7. It was found that the absorption capacity was stable at 32 mg/g from 0.5 min until 180 min and there was no further change in the adsorption capacity of lead, which indicated that the adsorption was faster for lead than thallium, confirming the ability of the prepared materials to separate lead from thallium by selective adsorption.

Example 10

The Effect of pH on the Absorption Capacity of Pb-201 onto Silica-NP/EDTA (A) and Silica-NP/EDTA-Surfactant (B)

Figure 8:
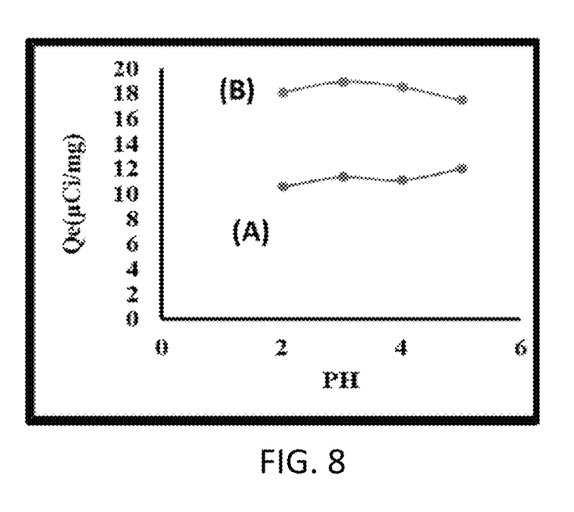
FIG. 8 shows a graph illustrating the effect of pH on the adsorption capacity of Pb-201 onto silica-NP/EDTA (line A) and silica-NP/EDTA-Surfactant (line B).

FIG. 8 represents the adsorption capacity of lead-201 which is produced as a radioactive byproduct during conversion of thallium-203 to thallium-201. The adsorbed lead-201 was converted to thallium-201 for medical applications. The adsorption capacity for lead-201 was 19 µCi/mg for silica-NP/EDTA-Surfactant, and around 11 µCi/mg in case of silica-NP/EDTA. This confirms the role of surfactant in the entire structure of the prepared silica/EDTA in isolation of lead-201. Furthermore, the rule of EDTA for enhancing lead-201 isolation was tested by applying silica-NP/EDTA-Surfactant and silica-NP-Surfactant as illustrated in Table 1 below. The silica-NP/EDTA-Surfactant showed the highest efficiency and adsorption capacity for lead-201 separation.

TABLE 1

Evaluation of silica-NP/EDTA-Surfactant and silica-NP-Surfactant for adsorption of Pb-201

| | Adsorption capacity | | Efficiency % | |
|---|---|---|---|---|
| | Qe | Average | Efficiency % | average |
| silica-NP-Surfactant | 28.504 | 28.15 ± 0.61 | 61.0 | 60.3 ± 1.3 |
| | 28.388 | | 60.81405 | |
| | 27.232 | | 58.33762 | |
| | 28.476 | | 61.00257 | |
| silica-NP/EDTA-Surfactant | 40.692 | 40.16 ± 0.76 | 87.17224 | 86.0 ± 1.6 |
| | 40.652 | | 87.08655 | |
| | 39.06 | | 83.67609 | |
| | 40.236 | | 86.19537 | |

The silica nanoparticles were successfully prepared and modified with EDTA and surfactant to provide functionalized silica nanoparticles. The formed structures were in a uniform-spherical shape. The particle size of the whole sphere is from 361 nm to 580 nm. The XRD and FTIR analysis confirms the formation of the silica nanoparticles in case of applying the modification procedures to produce modified silica nanoparticles. The silica nanoparticles have shown a noticeable ability for selective separation of lead and thallium at pH of 3 within 0.5 min. The adsorption onto prepared silica nanoparticles was applied to separate radioactive isotopes of lead-201 with efficiency of 86% at pH 3 using the silica-NP/EDTA-Surfactant. The successful isolation of lead-201 can facilitate minimizing environmental pollution as well as, providing thallium 201 which can be applied in nuclear medicine for diagnoses of heart disease.

It is to be understood that the functionalized silica nanoparticles for lead adsorption are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method for preparing functionalized silica nanoparticles, the method comprising:
   combining centrimonium bromide (CTAB) with water and ethanol to create a first reaction mixture;
   stirring the first reaction mixture;

adding NH$_4$OH to the first reaction mixture to create a second reaction mixture;
stirring the second reaction mixture;
adding a first amount of tetraethyl orthosilicate (TEOS) to the second reaction mixture to create a third reaction mixture;
stirring the third reaction mixture;
adding ethylenediaminetetraacetic acid (EDTA) and a second amount of TEOS to the third reaction mixture to provide a fourth reaction mixture;
stirring the fourth reaction mixture to obtain formed silica spheres;
separating the formed silica spheres;
washing the formed silica spheres with water and ethanol;
drying the formed silica spheres in an oven to provide functionalized silica nanoparticles; and
mixing the silica nanoparticles with about 150 mL of acetonitrile and about 13 mL hydrochloric acid to create a mixture.

2. The method of claim 1, wherein about 1 gram of CTAB is combined with about 200 mL water and about 100 mL ethanol.

3. The method of claim 1, wherein the first amount of TEOS comprises about 1000 μL and the TEOS is added in about five 200 μL increments and each of the about five increments is added at least about every 10 minutes.

4. The method of claim 1, wherein about 50 mL of EDTA having a concentration of about 1000 mg/L is added to the third reaction mixture.

5. The method of claim 1, wherein the second amount of TEOS is about 1000 μL and is added in about two 500 μL increments and each of the about two increments is added at least about every 30 minutes.

6. The method of claim 1, wherein the formed silica spheres are separated by centrifuge.

7. The method of claim 1, wherein the formed silica spheres are dried in an oven for at least about 8 hours.

8. The method of claim 1, wherein the mixture sets for at least about 12 hours and is then centrifuged to provide functionalized silica-nanoparticles in EDTA.

* * * * *